(12) United States Patent
Zazula et al.

(10) Patent No.: US 8,605,613 B2
(45) Date of Patent: Dec. 10, 2013

(54) MOBILE HARDWARE AND NETWORK ENVIRONMENT SIMULATION

(75) Inventors: Ralph Zazula, Mountain View, CA (US); Greg Gilley, Los Altos, CA (US); Ryan Rowat Klems, Oro Valley, AZ (US); Mark Malone, Santa Cruz, CA (US)

(73) Assignee: Apple Inc., Cupertino, CA (US)

(*) Notice: Subject to any disclaimer, the term of this patent is extended or adjusted under 35 U.S.C. 154(b) by 352 days.

(21) Appl. No.: 12/969,494

(22) Filed: Dec. 15, 2010

(65) Prior Publication Data

US 2012/0155292 A1    Jun. 21, 2012

(51) Int. Cl.
*H04L 12/28* (2006.01)
*H04J 1/16* (2006.01)

(52) U.S. Cl.
USPC .......................... 370/252; 370/248; 370/329

(58) Field of Classification Search
USPC .............. 370/252, 913, 241, 241.1, 245, 248, 370/329; 709/229, 217; 711/220; 714/1, 25, 714/37, 38, 4, 47; 717/107, 135, 145; 382/100; 703/22, 23; 455/556.1, 67.11
See application file for complete search history.

(56) References Cited

U.S. PATENT DOCUMENTS

| | | | |
|---|---|---|---|
| 7,085,590 B2 * | 8/2006 | Kennedy et al. | 455/556.1 |
| 7,143,019 B2 * | 11/2006 | Gabele et al. | 703/13 |
| 7,152,027 B2 | 12/2006 | Andrade et al. | |
| 7,174,534 B2 * | 2/2007 | Chong et al. | 717/105 |
| 7,174,535 B2 * | 2/2007 | Wragge | 717/107 |
| 7,499,824 B2 | 3/2009 | Johnson et al. | |
| 7,813,910 B1 * | 10/2010 | Poulin | 703/22 |
| 7,873,321 B2 * | 1/2011 | Fok et al. | 455/67.11 |
| 7,954,094 B2 * | 5/2011 | Cascaval et al. | 717/145 |
| 8,150,675 B1 * | 4/2012 | Ortmanns et al. | 703/23 |
| 8,332,203 B1 * | 12/2012 | Poulin | 703/22 |
| 2002/0059054 A1 | 5/2002 | Bade et al. | |
| 2007/0261035 A1 * | 11/2007 | Duneau | 717/135 |
| 2008/0069396 A1 * | 3/2008 | He et al. | 382/100 |
| 2008/0147371 A1 | 6/2008 | Gupton et al. | |
| 2009/0006071 A1 * | 1/2009 | Dournov et al. | 703/22 |
| 2009/0279673 A1 | 11/2009 | Maffre et al. | |
| 2009/0292791 A1 * | 11/2009 | Livshits et al. | 709/217 |
| 2010/0082314 A1 | 4/2010 | Pritchard et al. | |

* cited by examiner

*Primary Examiner* — John Pezzlo
(74) *Attorney, Agent, or Firm* — Womble Carlyle Sandridge & Rice LLP

(57) ABSTRACT

The present technology provides an ability to simulate the performance of mobile content in a more realistic testing environment than previously available. Specifically, the present technology can mimic the fluctuations in network states that mobile devices typically experience. As the mobile content is tested using the simulated network states, the present technology can record the performance of the mobile content and create a log of the performance. Further, the present technology can also analyze the mobile content performance log and recommend various optimizations to increase the performance of the content.

29 Claims, 20 Drawing Sheets

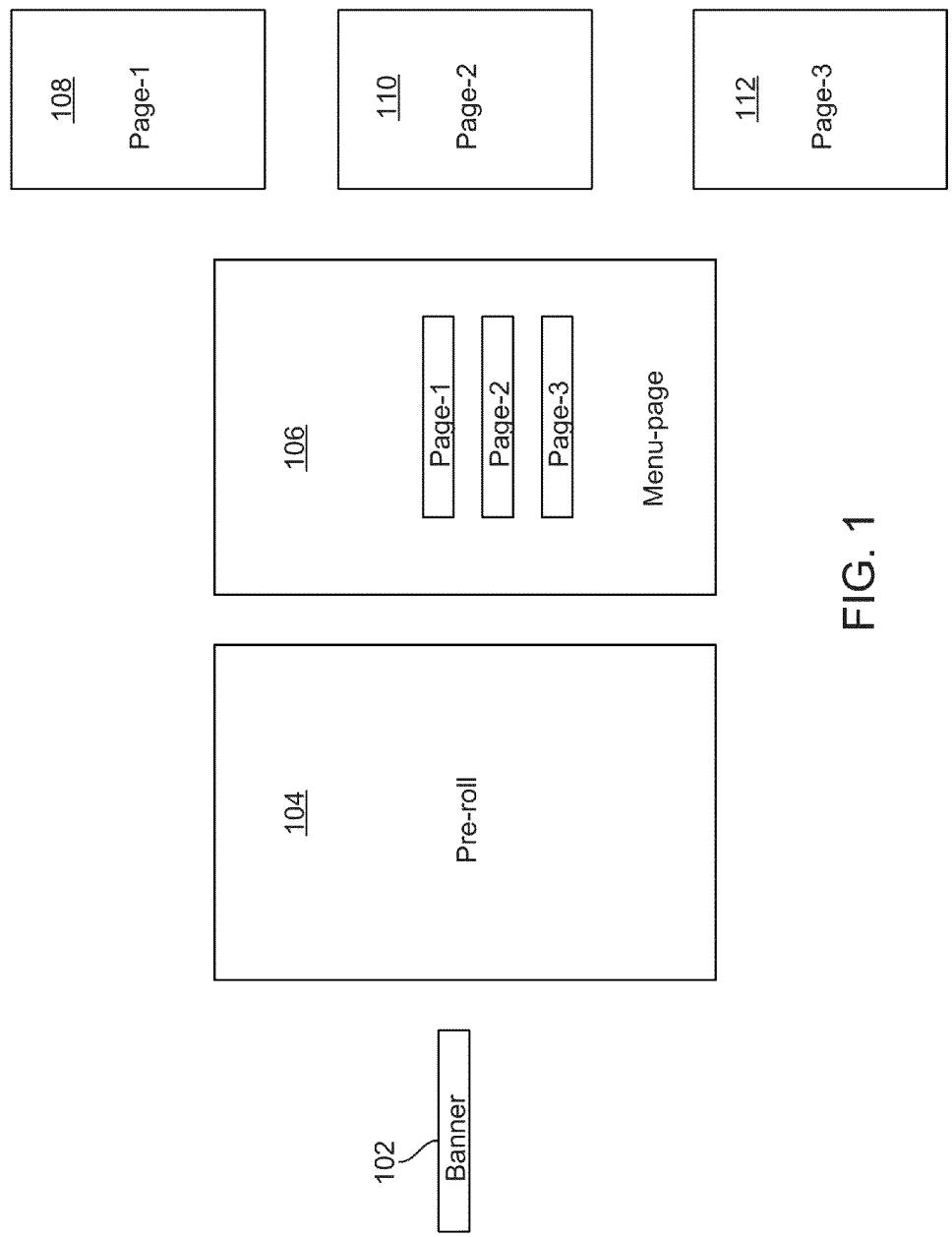

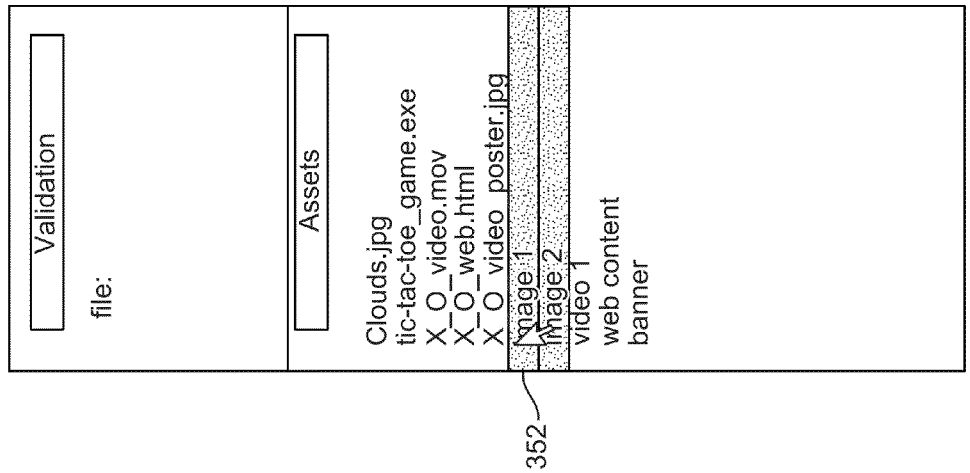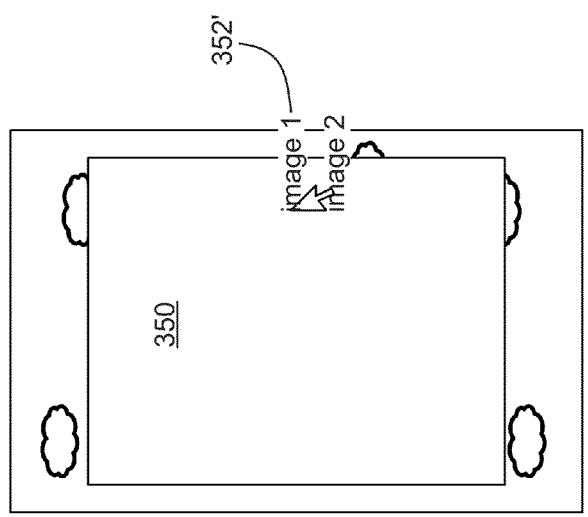
FIG. 4A

- *myApp*.ad
  - Properties —552
  - Creatives
    - *foo (creative #1)*
      - HTMLBanner
        - index.html
      - ImageBanners
    - *bar (creative #2, etc.)*
      - HTMLBanner
        - index.html
      - ImageBanners
- AppUnit
  - index.html
  - manifest —554
  - webarchive

FIG. 7

| Order Requested /652 | File /654 | Download Time /656 | Network /658 | Average Download Speed /660 |
|---|---|---|---|---|
| 1 | Archive | 3:02 | 3G, EDGE | 500 kbit/s |
|  | Pre-roll video |  |  |  |
|  | Background |  |  |  |
|  | Carousel |  |  |  |
|  | Icon 1 |  |  |  |
|  | Icon 2 |  |  |  |
|  | Icon 3 |  |  |  |
| 2 | Image 1 | :10 | 3G | 900 kbit/s |
| 3 | Image 2 | :10 | 3G | 1Mbit/s |
| 4 | Image 3 | :10 | 3G | 1Mbit/s |
| 5 | Web page | :001 | Wi-Fi | 8Mbit/s |

(table labeled 650)

FIG. 12

MOBILE HARDWARE AND NETWORK ENVIRONMENT SIMULATION

BACKGROUND

1. Technical Field

The present disclosure relates to an electronic content testing tool, and more specifically to a simulation tool for testing electronic content intended for distribution to, and display on, mobile devices.

2. Introduction

The authoring of electronic content has become a robust industry. With the continued rise and expansion of this industry, competition for projects also increases, which makes the delivery of high quality and well-performing content increasingly important.

At the same time, the environments in which the content is to be delivered and displayed becomes more varied. Rather than one or two operating systems running on devices with mostly similar performance capabilities, we now have a greater variety of device types with varying capabilities, and several different operating environments. Further complicating the operating environment landscape is that devices access content over diverse connection states. In many cases, a given device might be capable of operation over multiple connection states, such as a Local Area Network (LAN) or mobile network. Such variability makes it much harder for content authors to produce high quality and well-performing content.

SUMMARY

Additional features and advantages of the disclosure will be set forth in the description which follows, and in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present technology provides an ability to simulate the performance of mobile content in a more realistic testing environment than previously available. Specifically, the present technology can mimic the fluctuations in network states that mobile devices typically experience.

After mobile content has been authored, it can be uploaded to a testing server that can make the mobile content available to users authorized to access the content.

A user accessing the content can select from a variety of network conditions in which to test the mobile content. Specifically, the user can choose to test the performance of the mobile content over a 3G network, EDGE network, or a Wi-Fi network. The user can also select parameters to specify the performance of the network. In this way, the present technology acknowledges that there is wide variation in the actual performance of a given network depending on many factors.

Further, the user can also select to simulate a condition wherein the mobile device begins a download on one network, but switches to a second network (or the performance of the first network varies) during the download of the mobile content.

Additionally, the user can also select to simulate observed network states that exemplify some challenging network connections commonly experienced by mobile devices in everyday use. For example, one such observed network state can be a taxi ride New York City (or any other city). During a taxi ride, it is quite possible that from one block to the next the network performance can vary greatly. Selecting such an option can test the performance of the mobile content as if it were requested by a mobile device experiencing the observed network state.

As the mobile content is tested using the simulated network states, the present technology can record the performance of the mobile content and create a log of the performance. For example, the present technology can record the order in which files relating to, or making up, the mobile content are downloaded, how long the files took to download, the network conditions in which the mobile content was operating, etc.

The present technology can also analyze the mobile content performance log and recommend various optimizations to increase the performance of the content. For example, if a given asset is of a higher quality than can be appreciated by the target mobile device (e.g., the screen resolution doesn't support the resolution, etc.), it can be recommended to provide a lower quality asset that will be easier to download. In another example, if many small files are being requested on a network with high latency, it can be recommended to sprite the files or provide them in a common archive so that only one request for content need be made. Further, if analysis of the order in which the files of the mobile content are requested shows that there is a commonly requested file, it can be recommended to send that file as part of an initial request for content Likewise, if a file is being sent as part of an initial request for content that is rarely accessed, it can be recommended to remove the file from the initial download package.

Accordingly, the present technology provides a system and method for testing the performance of mobile content using realistic and customizable simulations to ensure the best possible performance of the mobile content once published.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure, and are not therefore to be considered to be limiting of its scope, the principles herein are described and explained with additional specificity and detail through the use of the accompanying drawings in which:

FIG. 1 illustrates an exemplary graphical-application-flow template screen within a graphical user interface of the authoring tool;

FIG. 4A illustrates an exemplary action inserting multiple images into a page;

FIG. 7 illustrates an exemplary package of mobile content for publishing to a server;

FIG. 12 illustrates and exemplary report generated from a mobile content simulation

DETAILED DESCRIPTION

Figure 2A:
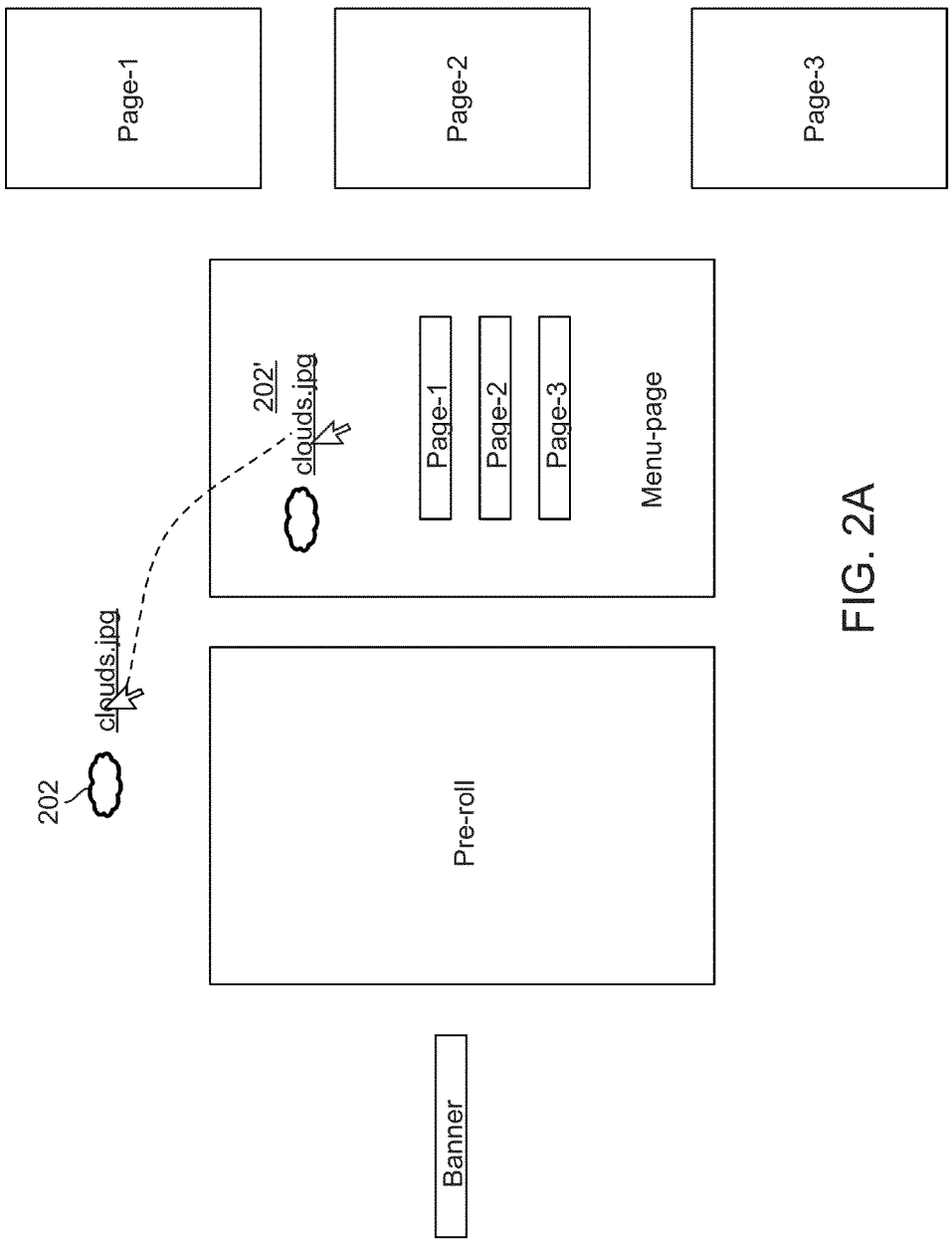
FIG. 2A illustrates the exemplary graphical-application-flow template screen as an initial content creation screen.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art to test electronic content intended for display on a mobile device, such as a smartphone, tablet, personal multi-media playing device, etc. by simulating conditions that are similar to the conditions in which a mobile device commonly operates. As the name implies, a mobile device is portable, and it is often used while a user is on the move. As such, mobile devices are known to experience a fair degree of variation in network conditions as the device moves along with the user.

Accordingly, the present technology relates to a computer-implemented simulation of distribution and presentation of electronic content intended for a mobile device (hereinafter, "mobile content"). The present technology is configured to adjust signal strength, network type, bandwidth, download speeds, latency, and other network state characteristics during testing of mobile content. Further, in some embodiments, the present technology can monitor the performance of the mobile content and report performance characteristics. In some embodiments, the present technology can provide recommendations on how to optimize the mobile content for better performance in the simulated network states.

Before discussing the simulation of mobile content, it is useful to address the characteristics of an exemplary item of mobile content. FIG. 1 illustrates a graphical-application-flow template screen within a graphical user interface of an authoring tool for creating a media rich mobile advertisement. (While the following discussion relates to a mobile advertisement, any mobile content can be used in the simulation environments of the present technology.) The screen illustrated in FIG. 1 illustrates a general layout of the mobile advertisement.

The banner 102 is often the first part of the mobile application presented to a content consumer. In some embodiments, the banner can be an image, video, or text that is presented to a content consumer, sometimes within other content. In such instances, the banner is similar to a banner advertisements commonly encountered on the Internet. In some embodiments, the banner is more akin to an icon on a desktop.

A content consumer can interact with the banner 102, often in the form of a click or selection action, which progresses the content into its next screen, the pre-roll 104. The pre-roll screen can be as simple as an icon indicating that the full content is loading, or more involved, such as a progress base, title page, or a movie.

After the pre-roll screen has completed, the user is presented with the menu-page 106. The menu page is analogous to a home page on an Internet website, or a title menu commonly encountered in a movie on a digital video disk (DVD). The menu-page 106 links to all or most other subsequent pages of the application. As an example, menu-page 106 links to subsequent pages, Page-1 108, Page-2 110, and Page-3 112, which each contain their own content.

While the template illustrated in FIG. 1 is one example of a potential application template, other templates may be available. In some embodiments, the templates can be modifiable. For example, one or more additional screens can be added, deleted, repeated, or otherwise modified as seen fit by the content-creator.

The screens of the application are adapted to accept content, which is provided as assets brought into the application. A content-creator can add assets to the pages to easily fill out their application. An asset can be any file containing digital content including, but not limited to, video, audio, movies, software modules, etc. In some instances, one or more assets can be interrelated. In some embodiments, there can be multiple versions of the same asset, assets that work along with other assets, assets created from other assets, etc.

In some embodiments, it is also desirable to name the image file according to a pre-defined naming convention so that the authoring tool can identify an asset or relationship among assets based on the naming convention.

In some instances, when an asset is imported, the authoring tool can recognize that another related asset is needed and automatically create the asset. Using a movie file as an example, if the movie file is imported without a poster frame, the authoring tool can search the movie file for its poster frame and extract the poster frame image.

Assets can be added to the page templates by dragging the asset from an asset menu and dropped onto the page templates, by using an insert asset menu option, or by any other known mechanism for inserting an object.

Figure 2B:
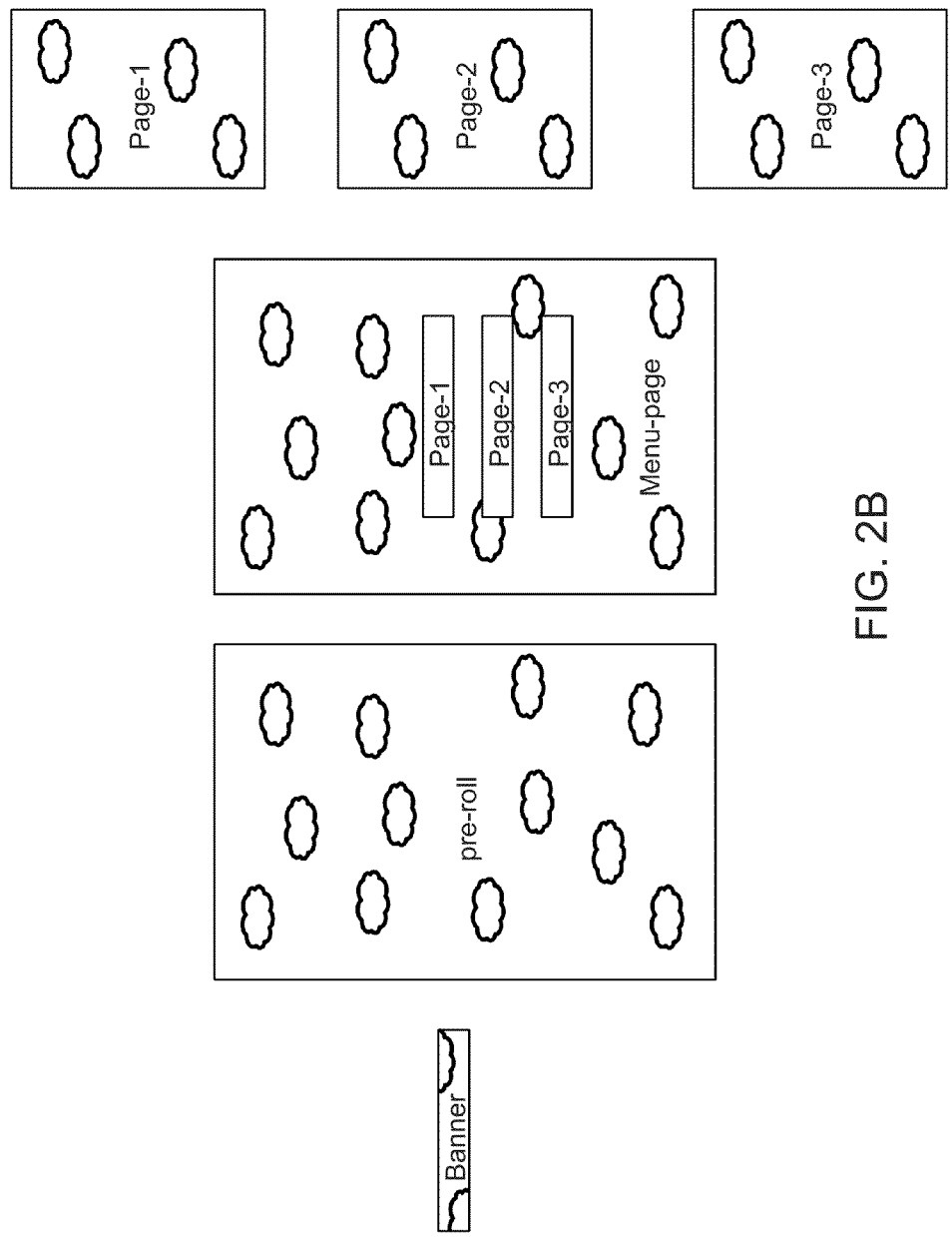
FIG. 2B illustrates the result of the action illustrated in FIG. 2A.

FIG. 2A illustrates the graphical-application-flow template screen as an initial content creation screen. In FIG. 2A, the content-creator has selected an asset, a clouds.jpg image 202 and drags the image onto the menu page as indicated by 202'. FIG. 2B illustrates the result of the action illustrated in FIG. 2A, wherein the clouds.jpg image has been applied to the entire template. Each page in the graphical-application-flow template now has the clouds.jpg image as a background image.

Figure 3A:
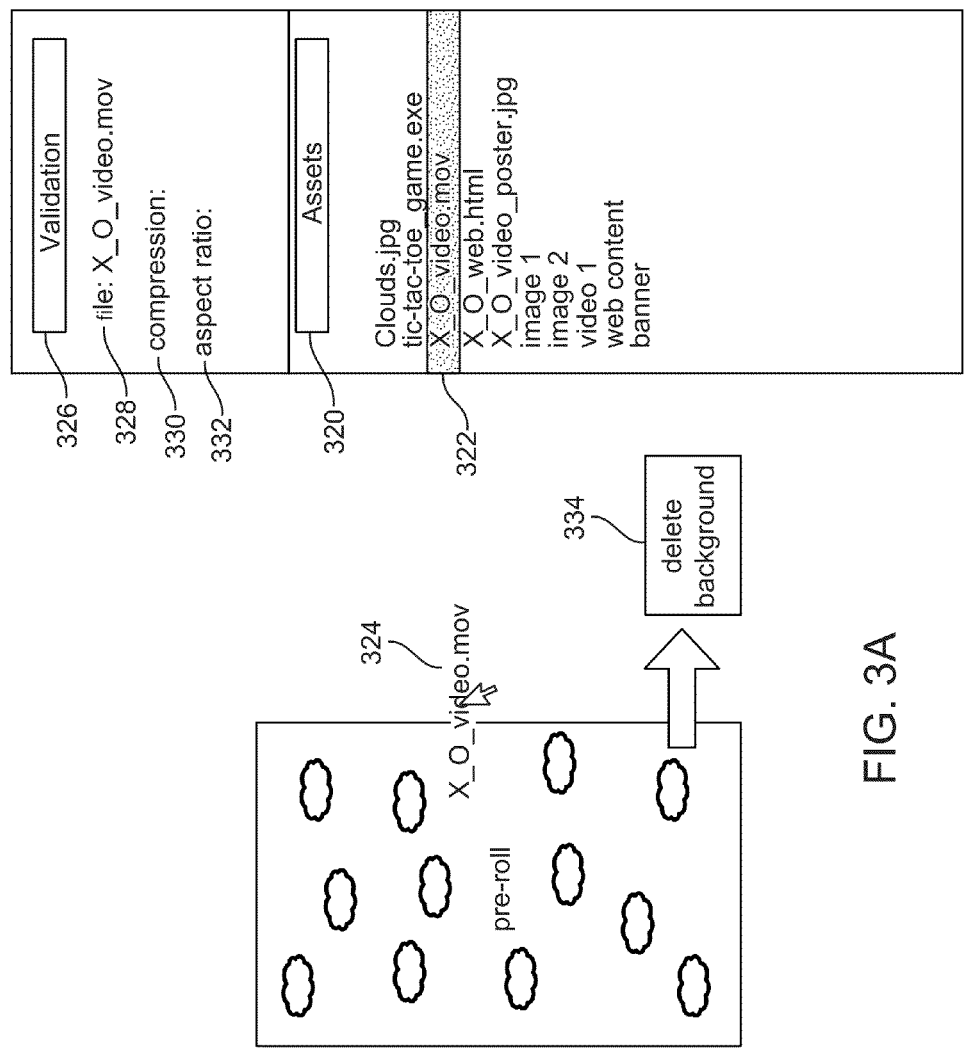
FIG. 3A illustrates exemplary modifications made to the content of a single page.

FIG. 3A illustrates modifications made to the content of a single page. 334 illustrates that commonly applied elements can be modified or removed on the individual pages of the application. Specifically 334 illustrates that the cloud background that was automatically applied to the pre-roll page in the graphical-application-flow template screen can be removed from this page, individually, in this screen specific view.

Also illustrated in FIG. 3A is an "Assets" menu 320. This menu graphically lists each of the assets that are available for inclusion into the program. These assets include text, videos, web content, images, etc. that the user has created and made available to the authoring tool.

Also illustrated is a Validation tool 326 to validate selected assets. In the illustration, X_O_video.mov 322 is selected, and the validation tool can illustrate the particular characteristics of the file and whether those characteristics are compatible with one or more mobile device types for which the content is intended to be displayed. Validation will be discussed in more detail below.

FIG. 3A also illustrates that asset 322 is being dragged on dropped 324 on the Pre-roll screen, thus inserting the asset onto the Pre-roll page.

Figure 3B:
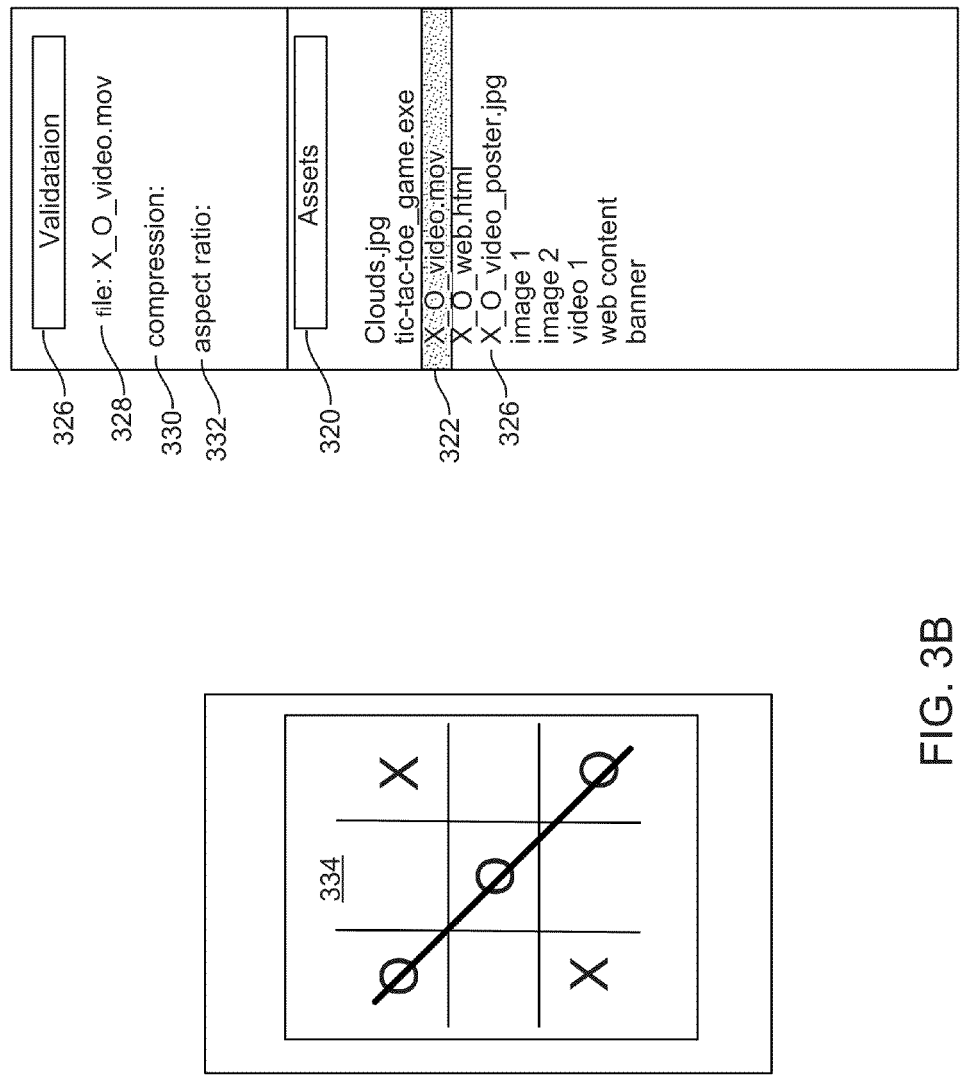
FIG. 3B illustrates an updated Pre-roll page based on the action illustrated in FIG. 4A.

FIG. 3B illustrates the updated Pre-roll page. The cloud background has been deleted and the X_O_video.mov has been inserted on the Pre-roll pages and its poster image (asset 326) is displayed 334.

FIG. 4A illustrates that multiple assets can be inserted into a page. Specifically Page-1 is shown having an object container, or placeholder 350. A user has selected two images 352, image 1 and image 2 and has dragged and dropped the images 352' into placeholder 350.

Figure 4B:
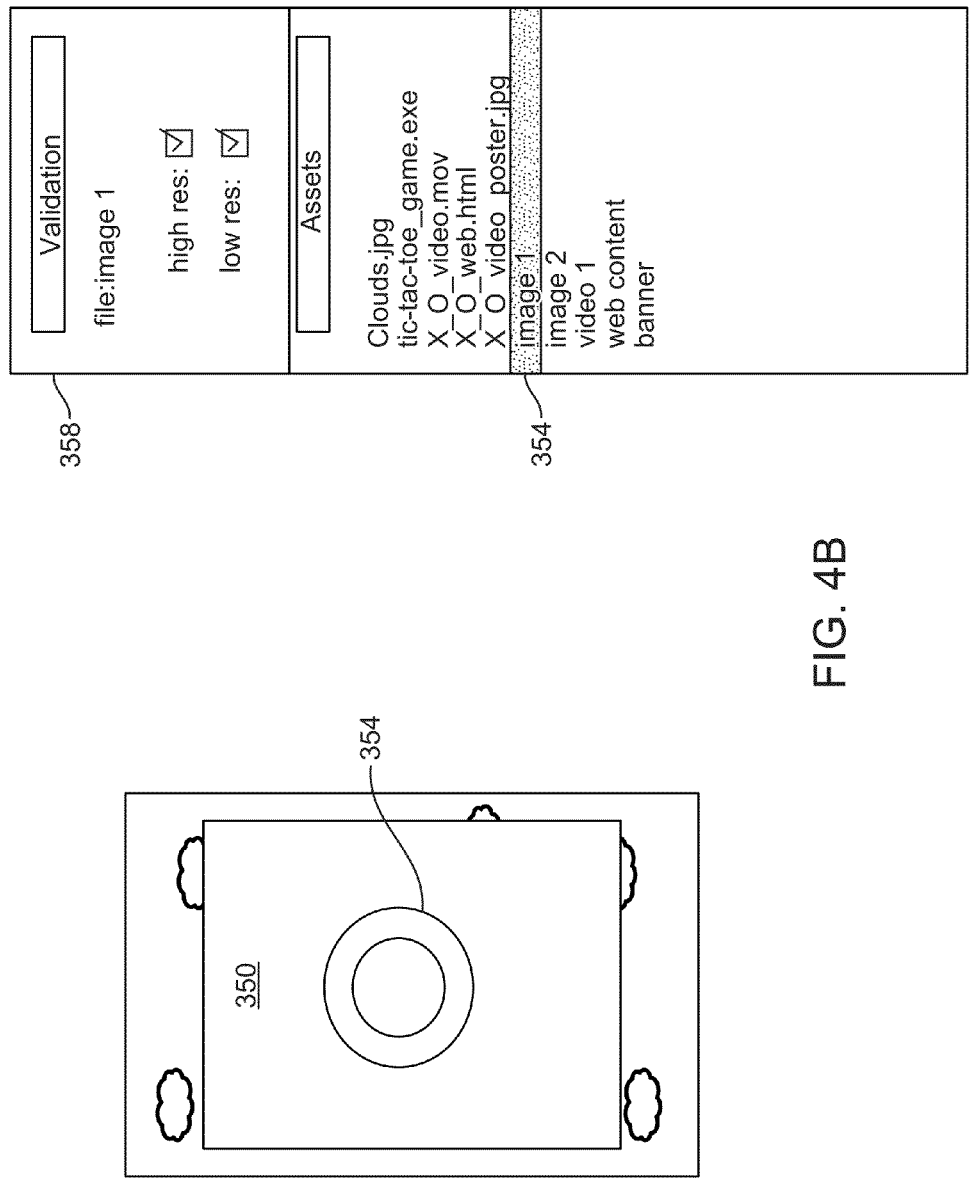
FIG. 4B illustrates the page from FIG. 5A updated with one of the images inserted.

FIG. 4B illustrates the updated page having both images of the images inserted, but only displaying the first image. Specifically, container 350 is shown with image 354 displayed within it. Additionally, the validation tool 358 is shown validating that the image 354 is available in the required resolutions (high and low). When image 1 was imported, the user imported two images—the high-resolution image and the low-resolution image. However, for simplicity of use, the authoring tool recognizes that the images are two different versions of the same asset and displays a common asset in the asset library. This allows the user to manipulate a single object (e.g., dragging to the canvas) to make the assignment and the authoring tool works behind the scenes to grab the appropriate version based on the current display mode. In some embodiments, the assets conform to a naming convention to allow the authoring tool to associated two different versions of the assets. For example, a user can create image_1@2x.jpg and image_1.jpg files. When imported, we associate these two as the 2x and 1x versions, respectively, for an asset named image_1.jpg. In the user interface the authoring tool would only display one entry, but flags it to indicate it is a multi-resolution asset, for example: image_1.jpg [1x] [2x]. The availability of both required assets is indicated in the real time validation tool 358.

Figure 4C:
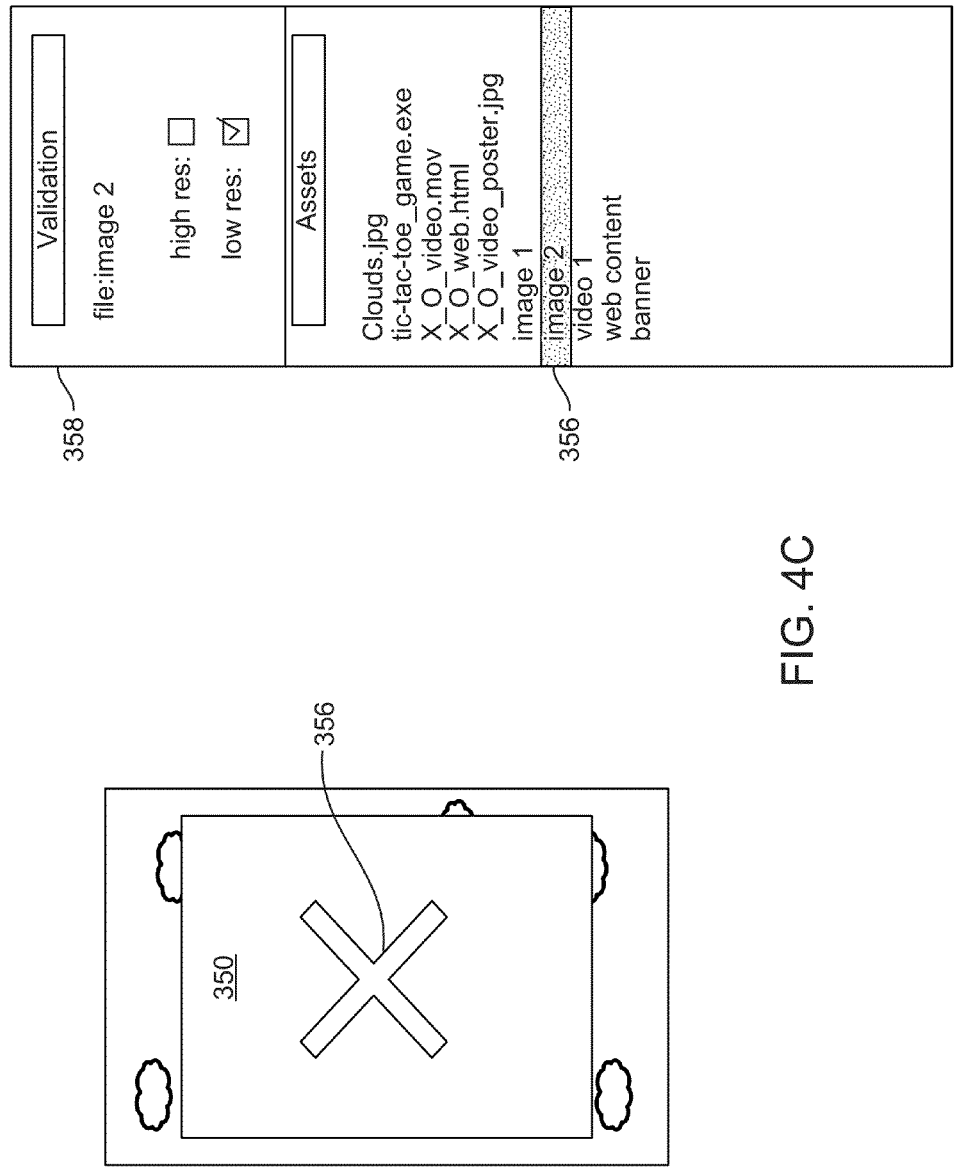
FIG. 4C illustrates the page from FIG. 5A updated with one of the images inserted.

FIG. 4C illustrates the updated page having both of the images inserted, but only displaying the second image. Specifically, container 350 is illustrated with image 356 displayed within it. In this instance, the content creator has chosen to navigate to the second image within the design application. It can be especially useful to show the exact assets and user interface that the end user device will see at run time so that the content designer can adjust the content as needed. Additionally, validation tool 358 indicates that image 2 356 is only available in low resolution and that a high resolution image may still be needed.

While in some embodiments, it is possible for the authoring program to make missing assets from available counterparts. For example, the authoring tool may be able to create a lower resolution image from a properly sized higher resolution image. In either case, the application will indicate which assets were provided by the user and which were automatically generated, so that the user can review these proposed auto-generated assets and decide if he/she wants to use them or provide his/her own.

Figure 5A:
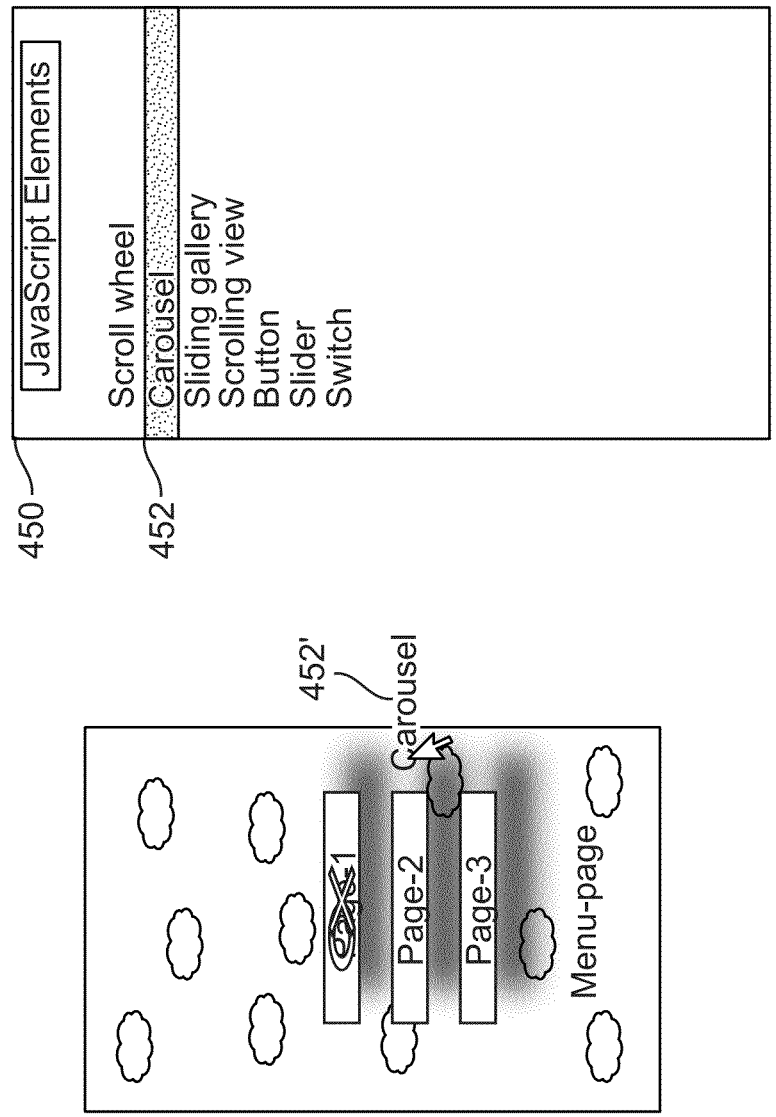
FIG. 5A illustrates an exemplary menu of JavaScript elements.
Figure 5B:
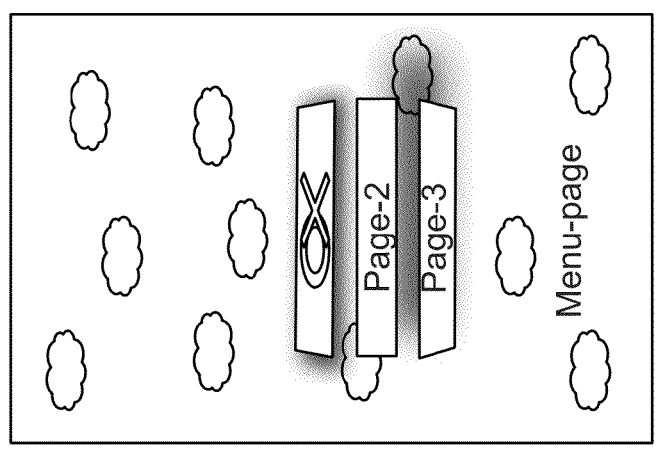
FIG. 5B illustrates an exemplary menu of JavaScript elements.

Assets can also include code elements, such as Java Script elements and Cascading Style Sheets (CSS) elements. FIG. 5A and FIG. 5B illustrates a menu of JavaScript elements that can be adjusted according to the preferences of the content author. It is desirable to allow content-creators to introduce and adjust their content as much as possible within the user interface. As such, the present technology makes use of a JavaScript library of JavaScript elements, such as those presented in the JavaScript menu 450. The JavaScript library can include primitive elements, such as buttons, sliders, and switches that are used standalone; and more complex "composite" elements, such as carousels, scroll views, and lists that have multiple "cells" that may contain primitives and other composite elements. It should be appreciated that the other common JavaScript elements not shown here can also be included in the JavaScript library.

As illustrated, a user has selected the Carousel element 452 and dragged and dropped the Carousel element 452' onto the menu page. Such action transforms the listing of links on the menu page into a rotatable 3-D Carousel as illustrated in FIG. 5B.

In some embodiments, widgets or inspectors can also be provided for adjusting known variables within the JavaScript code. For example, in the case of the rotatable 3-D Carousel, the shape of the menu items, the speed and direction of rotation, spacing, number of objects in the menu can be adjusted using an inspector.

Figure 6:
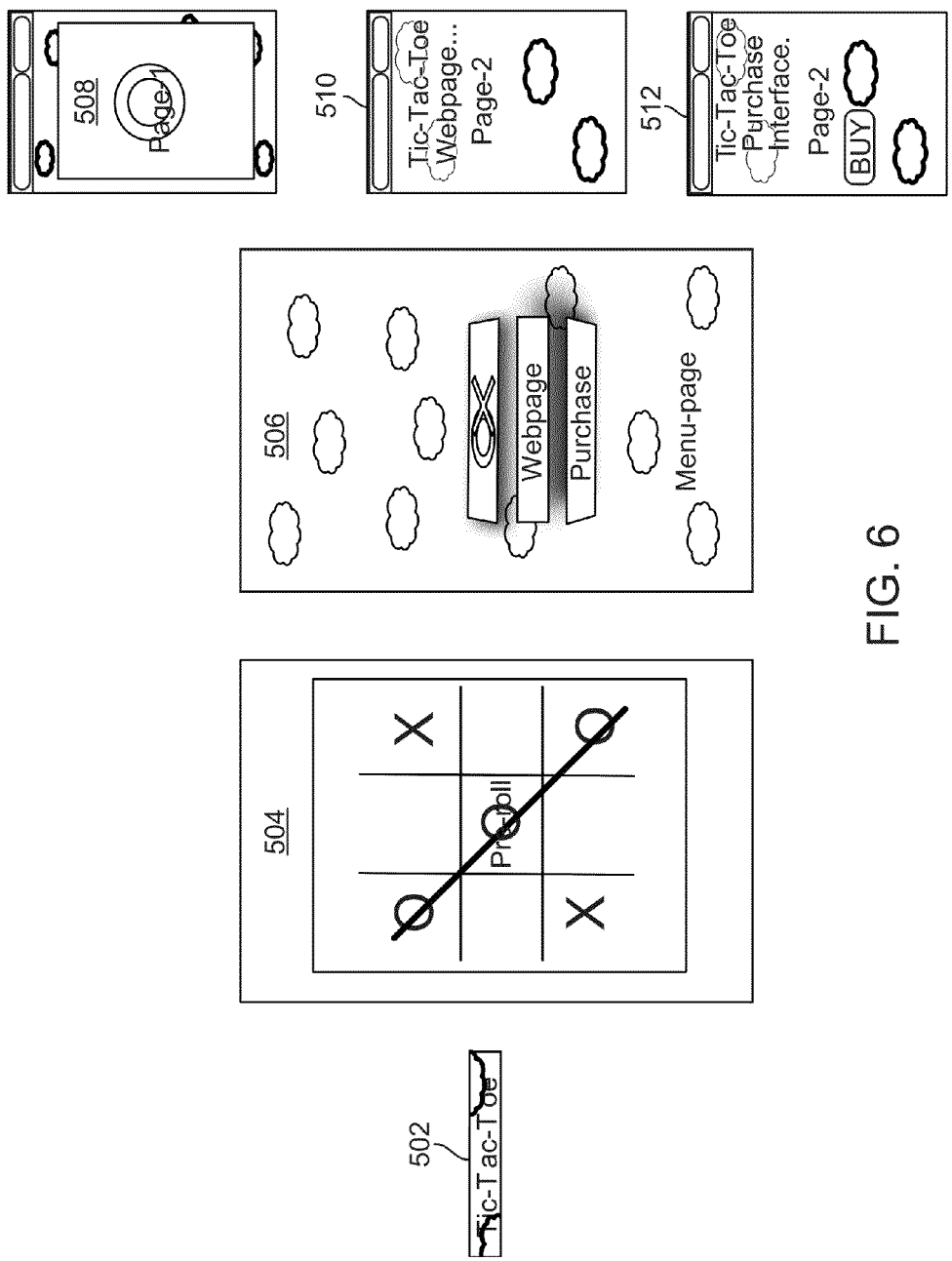
FIG. 6 illustrates a completed application in the graphical site map view.

FIG. 6 illustrates a completed application in the graphical site map view. The banner image 502 is illustrated having the clouds background asset and the Tic-Tac-Toe title of the application. If a user clicks on, or interacts with, the banner, the application will launch and proceed to the Pre-roll page 504. The Pre-roll page 504 is illustrated without the clouds background asset and containing the Tic-Tac-Toe movie assets. Presently, the poster frame image asset is displayed, though, if a user interacts with the image asset, or a determined period of time has lapsed (such as the time to load or buffer the movie), the movie asset will begin to play. After the completion of the movie, the application progresses to the Menu-page 506. The Menu-page 506 includes the rotatable 3-D Carousel asset having links to the image assets Page-1 508, a Webpage, Page-2 510, and a Purchase Interface, Page-3 512. Clicking on any menu link will take the user to the respective page to view the associated content. Scrolling the rotatable 3-D Carousel will rotate the carousel to the next menu item.

Having a complete application is only one step in successfully publishing electronic content and presenting it to users. As addressed above, today's devices come in many different sizes and have different display and processing capabilities. Accordingly, content often needs to be configured or optimized for different devices. Such a step requires knowledge of the capabilities of each device. Additionally, different users connect to the Internet in various ways and sometimes multiple ways, even in the same usage session. Accordingly, getting content to users requires taking into account the variance in the different network technologies too.

Even if a content developer did understand the varying capabilities of the different device and network connections, and further knew the different specifications required to optimize content for delivery and presentation on a content consumer's device, creating optimized packages of each application would be a time consuming process.

Accordingly, some content creation technologies can attempt to automatically validate the assets before publishing. Before creating a content package optimized for a particular device, the assets within the application must have their compatibility with a device's specifications and common network types validated. The content distribution server might also impose certain requirements, and these too can be considered in the validation process. For example, images might need to be validated for appropriate bpp, and aspect ratio, while videos might require need to be validated for frame rates, size, aspect ratios, compression, encoding type, etc.

As addressed above, some assets are available in multiple versions. In some embodiments, the respective versions are intended to be distributed to specified devices or during specified network states (connection between the mobile device and the server).

The multiple versions may be provided manually by the user, or they may be provided automatically by the authoring application or server by downsampling a "hi-resolution" version to lower resolution versions as needed or by downsampling an ultra-resolution "reference" version to a "hi-resolution" version and all subsequent lower resolution versions as needed. In the case of automatic downsampling, this can be done based on the original asset dimensions, assuming it will be displayed at its natural size, e.g., a 100×100 pixel image can be down sampled to a 50×50 image if the hi-resolution and lo-resolution requirements differ by 50% in each dimension.

In addition to dimension-based versions, bandwidth-based versions may also be created, and other advanced optimization techniques can be applied, to ensure optimal download speed over varying network types (EDGE, 3G, WiFi).

To ensure compatibility with the advertisement server, networks and known devices, image assets are analyzed to ensure they meet size requirements such as a maximum total size, and maximum image resolution based on bits-per-pixel (BPP), e.g., EDGE network: <0.75 BPP, 3G network: <1.0 BPP, and WiFi: <2.0 BPP.

Video assets are analyzed to ensure they meet size requirements such as a maximum total size and maximum data rate, e.g., EDGE: 80 kbps, 3G: 300 kbps, and Wi-Fi: 1000 kbps.

System-generated and user-provided text assets are processed. For example, JavaScript is concatenated and minified, CSS is concatenated and minified, HTML, JavaScript and CSS is compressed, etc.

Advanced techniques can applied to image assets: multiple images are combined into a single "sprite" image to speed up downloading (one HTTP request versus multiple); HTML, CSS and JavaScript are edited to refer to the new sprite; individual images are inlined as base 64 data into HTML files to minimize HTTP requests; and a web archive is created as a single initial download (tar/zip) with essential advertisement elements.

Once all assets have been verified, the application must be packaged for upload and use by a content delivery server. FIG. 7 illustrates an example of a mobile-content-package structure prepared by a content provider that can be uploaded to a content server. The mobile content package can include a properties file, creatives, assets, and a targeted application accompanied by a manifest file. It should be appreciated that this package structure is presented merely for illustration, and other methods and structures for uploading a mobile content package to a server for distribution can be used.

The "myApp" directory includes a properties file 552 that describes properties of the files in the digital content bundle. The properties file can be used to describe any property that the content developer designates. For example, the properties file can describe supported devices, content that the creatives or application can be associated with, properties regarding the mobile content's operation, display, use, etc. In some embodiments, the properties file can also be used to describe when a content developer envisions a creative or asset might be distributed to a client device. For example, certain creatives might be designated for distribution to specified smartphones, or for use with specified applications or in specified contexts, etc.

The manifest file 554 defines selected items that should be packaged with the targeted application for distribution to a mobile device, such as a smart phone. In some embodiments, the manifest file can also contain additional information, for example a command to compress the selected items to be packaged with the targeted application for distribution into a single file. The manifest file 554, in one embodiment, is a text file with paths for all resources to be included in the webarchive. If a resource is included in the manifest file, it also should be included in the "myApp" directory. Additional items that are not included in the manifest file can also be included in the "myApp" directory. A targeted application designer can choose which items are most important upon execution of the targeted application by listing these items in the manifest file; all other items can be downloaded after execution of the targeted application. This allows application developers to strike a balance between content immediately available upon execution of the targeted application and device performance characteristics such as speed and memory usage as will become more apparent from the description below. While a content server could make its own decisions about the best organization of an archive (while files to be included, etc.), it is generally expected that a server will package the mobile content as instructed by the archive file.

However, before the package is uploaded/published to a content delivery server, it is desirable to test the application as it exists before the upload. Testing can reveal any errors or suggest optimizations of the entire package, including the package organization and the availability of low-resolution and high-resolution assets. This step can be especially important for professional content creators. Since content creation may be their livelihood they need to view each screen of the application, as it will be displayed on the individual devices after publication to the server. The importance of this step is even more important when some assets have been modified by the authoring tool, and therefore may not have been viewed by the content creator.

Just like with any other application, the creation, packing, and compression of quality mobile content requires sufficient quality assurance testing in the native environment. While an author of authoring tool will make his/her best effort to generate quality content on the first try, it is extraordinarily difficult to predict how the mobile content should be packaged (as indicated by the manifest file) to account for the mobile content's actual usage patterns and the unpredictably of content delivery over mobile networks. However, with mobile devices, the native environment can be very dynamic. Accordingly, the present technology provides a system and method for testing the application in conditions that simulate conditions in which a mobile device might operate.

During development of the application, content and functionality can be verified in an interactive environment by on-screen preview within the authoring environment and by toggling the editing "canvas" from authoring mode to interactive mode, causing the on-screen elements to become "live" and respond to user input. The project can also be exported to disk, such that it can be opened and viewed by the appropriate client application on the user's local machine, such as a web browser, other desktop reader application, mobile web browser, or other mobile reader application. Additionally, the project can be exported to a shared network location so it can be opened and viewed by the appropriate client application on a remote, network connected machine, such as a test device. Exporting to a shared network location also allows the project to be opened and viewed by the appropriate client application running in a local simulated environment. Another mechanism of exporting is to publish the content from within the authoring tool that allows access to the content via an appropriate client application running on a mobile device. In some embodiments, live changes can be made in the authoring environment and are published to the viewing application.

As addressed above, testing and previewing the authored application can be an extremely important step, especially for those that are using the authoring tool professionally. Accordingly, the authoring tools testing simulations include the ability to test in many different network states as well, so as to simulate the real world operation of the application. In some embodiments, the authoring tool can simulate a fast connection becoming slow, so that the content creator can view how the advertisement might look if server decided to send a lower resolution asset based on its real time analysis of network condition.

The present technology provides at least three testing environments, each configured to test the mobile content in progressively more realistic environments. In some embodiments, one or more of the testing environments can also be linked to a content creation application for easy testing of the mobile content during development.

Figure 8:
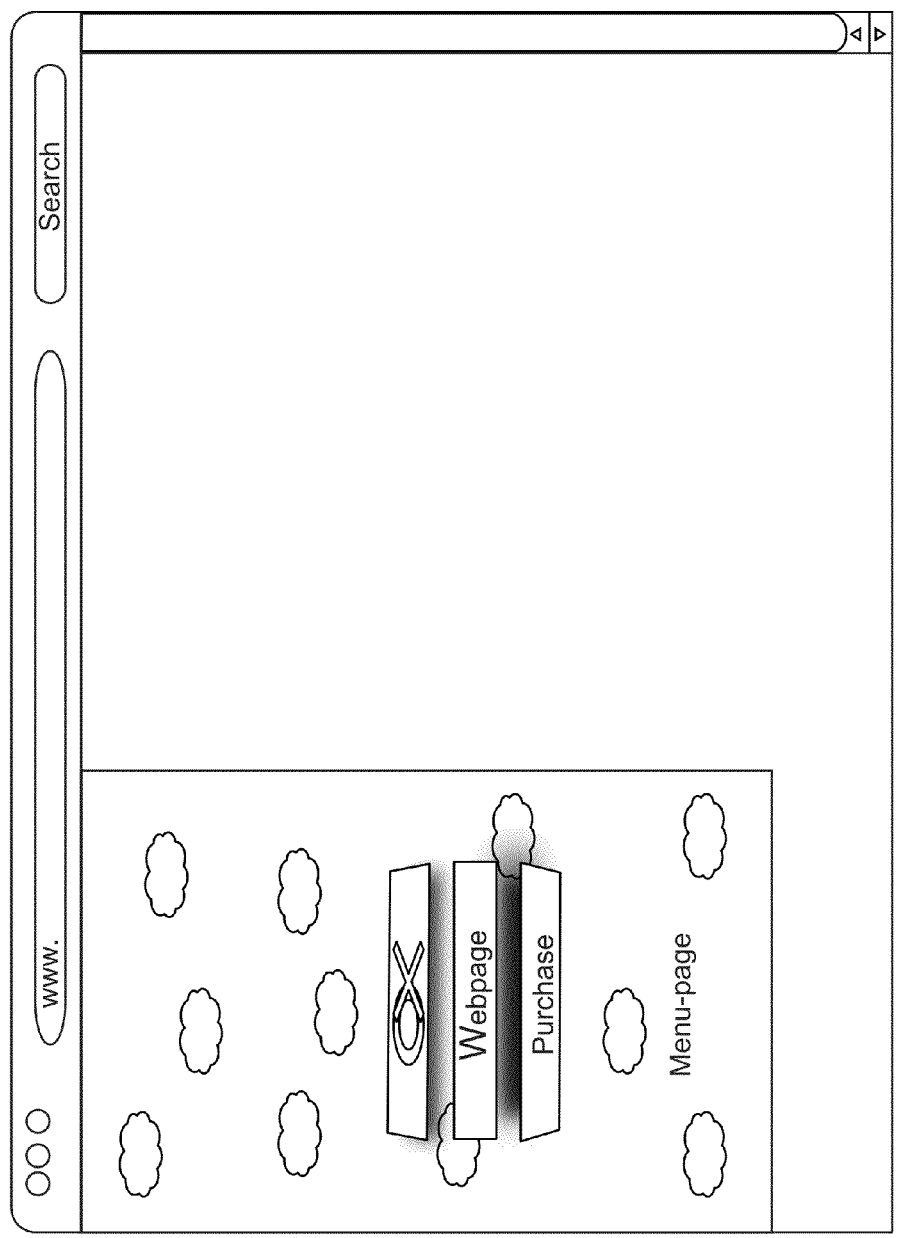
FIG. 8 illustrates an exemplary browser simulation embodiment.

FIG. 8 illustrates a testing environment in a browser window, and is configured to test mobile applications that are executable within an Internet browser. The testing environment in FIG. 8 can be accessed by a content authoring program. When a content author wishes to view or test the basic functioning or design of the mobile application, the content authoring application can launch the mobile content in the web browser to demonstrate the mobile content's basic functionality.

However, in this environment, any features of the mobile content that are tied to the mobile device or the mobile device operating system cannot function. Accordingly, this first testing interface is best suited to preliminary testing.

Figure 9:
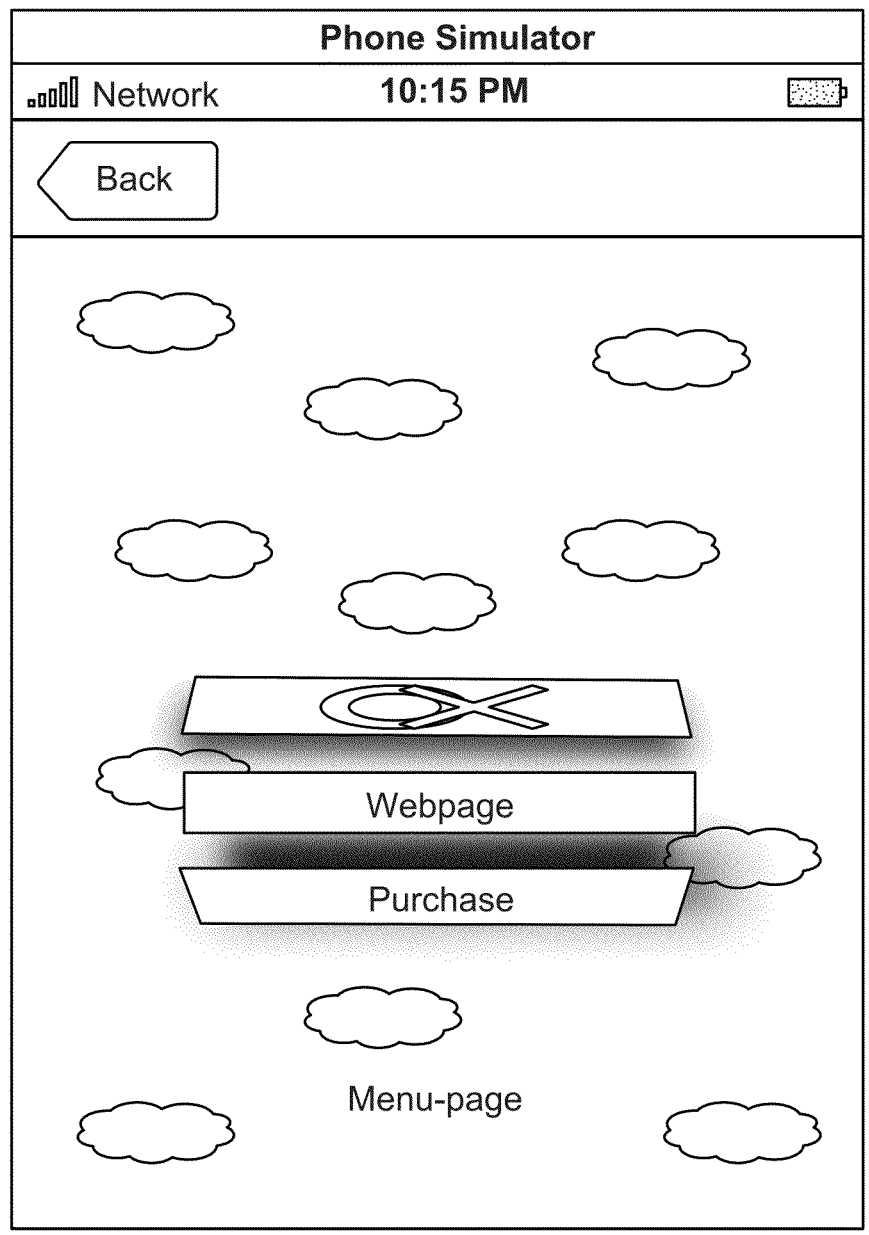
FIG. 9 illustrates an exemplary mobile device simulation embodiment.

FIG. 9 illustrates a testing environment that simulates the operating system of a mobile phone. This testing environment provides additional functionality over the testing environment in FIG. 8 in that it simulates all functions of the mobile phone, which allows for the full testing of the functionality of any mobile application created for that operating system. Accordingly, even applications that could not be executed in the Internet Browser of FIG. 8 will execute in the Mobile Device Simulator illustrated in FIG. 9 (provided that the operating system of the mobile device supports the mobile content).

The Mobile Device Simulator is suited to confirm that the mobile application is properly configured to operate on the simulated mobile device. In some embodiments, it can be launched from an authoring tool to confirm the functionality of the application as it is being developed. Such a tool is useful, for example, to confirm that the application properly interfaces with the operating system in order to take advantage of its functionality or device hardware. Some exemplary functionalities and hardware include a page rotate command; receiving GPS data; and receiving compass data, etc.

While the Internet Browser testing environment and the Mobile Device Simulator testing environment are useful, neither testing environment is an adequate substitute to testing the actual function of the mobile content on the device in an actual use case, to testing whether the any assets are missing from the application archive, or to testing how an asset will be affected by a slow or intermittent network connection.

Figure 10:
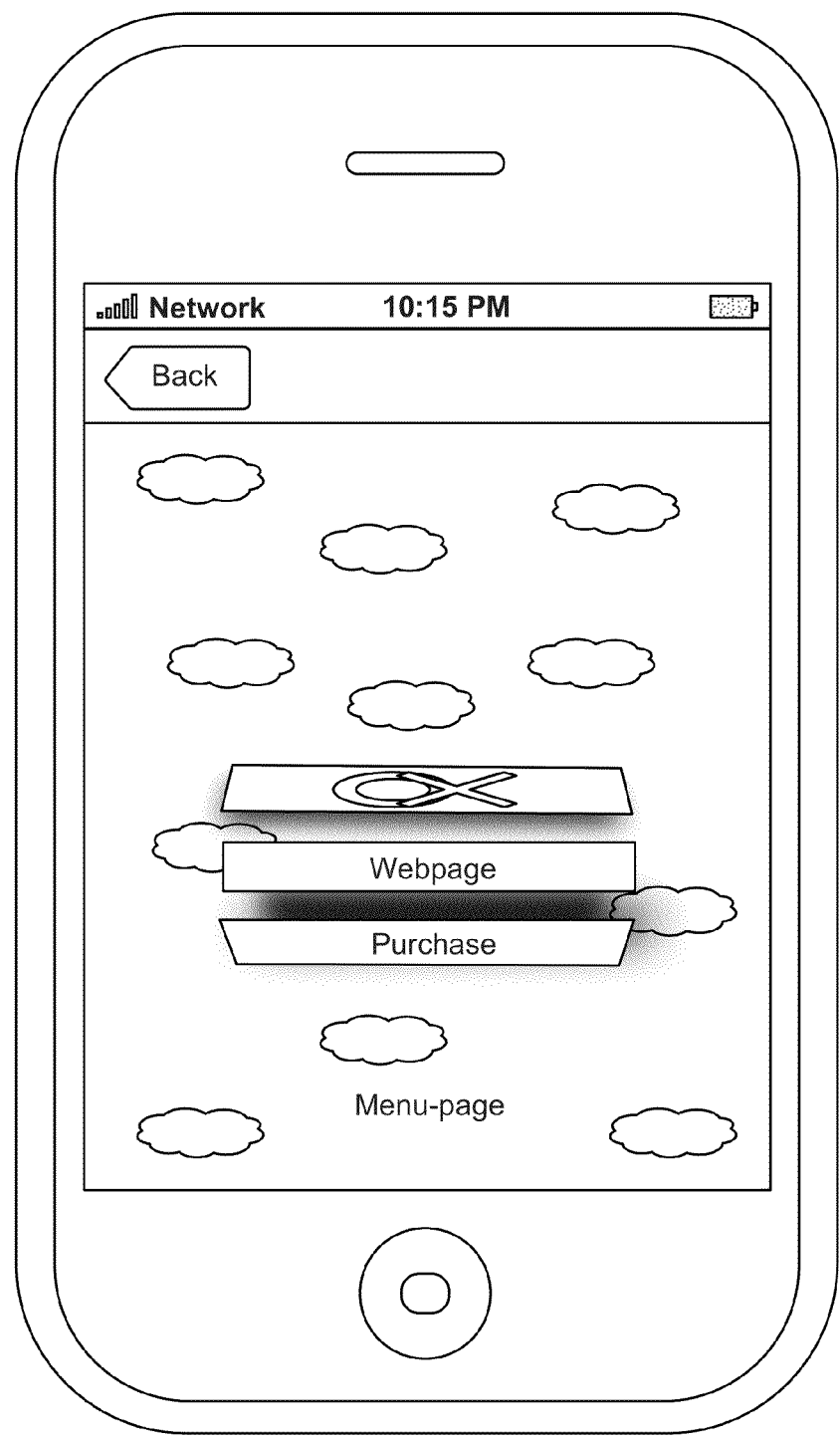
FIG. 10 illustrates an exemplary simulation embodiment on a mobile device

FIG. 10 illustrates a Mobile Device testing environment that requires the content to be downloaded and displayed to a mobile device. Testing the mobile content on the device is suitable for testing the function of the application using the device input interfaces and other hardware that was merely simulated in the Mobile Device Simulator.

Figure 11:
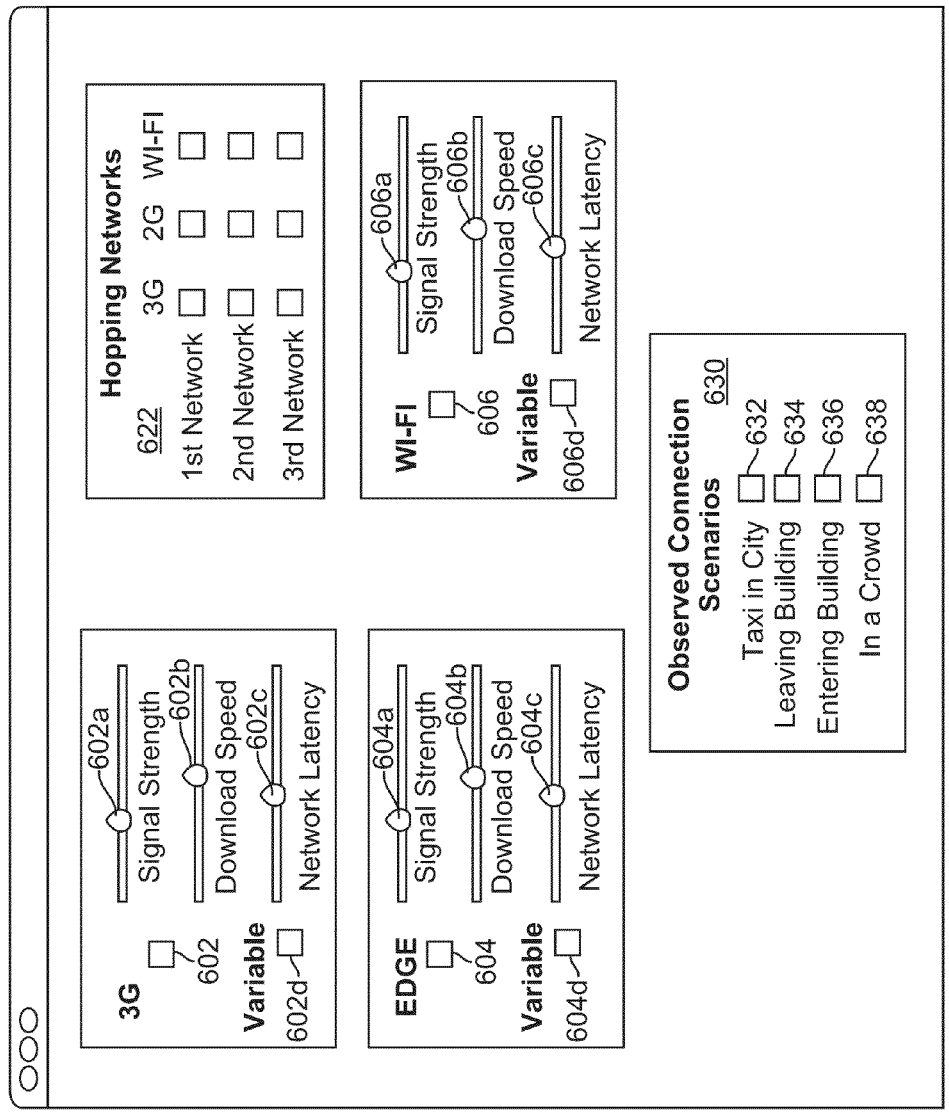
FIG. 11 illustrates an exemplary graphical user interface for selecting network states for use in a simulation

In order to simulate the network conditions in which the mobile device might experience when testing mobile content in one of these testing environments, the present technology includes a network simulator. FIG. 11 illustrates an exemplary interface for selecting network states that can be simulated when transferring the mobile content to the mobile device. Within the interface, a user can select to simulate a connection using an EDGE mobile network 604 or a 3G mobile network 602, or a Wi-Fi Internet connection 606. As the download speeds of these networks vary greatly, the amount of time to download one or more assets might be acceptable while connected to a Wi-Fi network, but not acceptable when connected to an EDGE mobile network. While a good connection to a fast network with low latency can cure many ills with respect to content choices, inclusion of assets in archives, and serving mobile content, a poor connection on a slow network with high latency can amplify poorly thought out assets.

In addition to choosing to simulate the EDGE mobile network 604 or a 3G mobile network 602, or a Wi-Fi Internet connection 606, the quality of those networks can also varied to simulate conditions that are sometimes encountered in real life. For example, a user in a stadium could encounter a very strong 3G signal, but due to the high number of devices on the network in the proximity and the related amount of network traffic, the network's speed and latency could be poor. In some instances, the performance of an EDGE connection could be better. Accordingly, a user can adjust the signal strength 602a, 604a, 606a, the realized download speed 602b, 604b, 606b, and the network latency 602c, 604c, 606c of the simulated networks.

In some instances, the performance of the mobile network can vary over time. Therefore, while a content author can test his/her content on network performing under specified conditions, it can also be helpful to test how mobile content performs under variable network conditions 602d, 604d, 606d. By selecting this option, the network signal strength, download speed, and latency can be algorithmically adjusted to simulate one of several observed examples.

In one alternative, the user can be presented with fewer variables that are representative of some more general network states. For example, the user could be presented with just several options: Wi-Fi, Good 3G, Fair 3G, Bad 3G, and EDGE connections, each associated with specific parameters as exemplified in Table 1, below:

| Connection | Bandwidth | Latency | Packet Loss |
|---|---|---|---|
| Wi-Fi | 16 Mbps | 100 ms | 0.2% |
| Good 3G | 1000 kbps | 250 ms | 0.2% |
| Fair 3G | 500 kbps | 500 ms | 0.2% |
| Bad 3G | 100 kbps | 800 ms | 0.5% |
| EDGE | 56 kbps | 1000 ms | 0.2% |

As an alternative to the user interface illustrated in FIG. 11, another possibility is to present the common user interface display of a series of bars representing signal strength. Each of the bars in the signal strength can be associated with parameters that define a network state, such as those disclosed throughout this specification. In another alternative, a user could presented with the type of service, i.e., 4G, 3G, EDGE, Wi-Fi, etc., and each bar of the signal strength user interface can be associated with a signal quality. For example, 5-bars=100% signal strength, 4-bars=80% signal strength, 3-bars=60% signal strength, 2-bars=40% signal strength, and 1-bar=20% signal strength.

Further, mobile devices commonly drop one network and pick up another. A mobile device can begin a download on a Wi-Fi connection and end it using 3G. Accordingly, content authors can test their mobile content against that simulated scenario by selecting the Hopping Networks option 622. Using this option, a content author can test the download of his/her content starting on one network, moving to a second network, and even ending on a third network.

In some embodiments, a content author can select from an observed connection scenario 630 rather than trying to choose the appropriate settings themselves from options 602, 604, 606, or 622. The observed connection scenarios represent several connection scenarios that a mobile phone could experience. For example, the "Taxi in City" scenario 632 can simulate a condition wherein the mobile device begins on one network and then drops the connection before connecting to a second network. The "Leaving Building" scenario 634 can simulate a condition, wherein the mobile device is connected to a Wi-Fi network, but switches to a mobile network. The "Entering Building" scenario 636 presents the inverse condition from "Leave Building," wherein the mobile device is connected to a mobile network, and then switches to a Wi-Fi network. The "In a Crowd" scenario 638 presents the condition described above in a stadium, wherein the mobile device experiences an excellent connection but poor download speeds and high latency.

Another option (not shown) is to provide a listing of actual connection statistics reported by devices in the field. For example, a user could be presented with an option of a device in San Francisco, Fisherman's Wharf at noon, which correlates to reported network connection from an actual device at that place and time. Selection of one of these connection states can simulate that actual, observed connection state.

As can be appreciated from the options available in the interface illustrated in FIG. 11, many different network conditions can be simulated. Those network conditions illustrated in FIG. 11 should not be considered an exhaustive list, nor should they be considered required options; they are merely illustrative of the concepts embodied in the present technology for simulating network connections and conditions in which a mobile device can operate.

Based on the simulations, reports can be generated that provide data regarding the performance of the mobile content. FIG. 12 illustrates an exemplary report 650 based on a simulation. The report lists the files downloaded 654, the order in which the files were requested for download 652, the time to download the file 656, the network connection used in downloading the file 658, and the average download speed 660.

The purpose of running these simulations and generating the report (as well as observing the performance) is to verify acceptable performance of the delivery to, and presentation of, the mobile content on a mobile device, and to identify solutions to improve the performance of the mobile content. Unacceptable performance (at least with respect to the network simulations) of the mobile content is most likely to be attributed to insufficiently compressed assets, assets that are too large and non-optimal asset packaging into the archive.

The determination of the cause for unacceptable performance can be made via comparisons against a database previously observed performance data or application of one or more heuristics. For example, using the data presented in the report illustrated in FIG. 12, the archive took three minutes to download at a rate of 500 kbit/s. Based on this information, we might determine that it took too long for the content to be downloaded to the mobile device. If this content were an advertisement, a user is not likely to wait three minutes to view an advertisement. Accordingly, we can conclude that the archive is too large, and that some items either need to be removed or further compressed.

One exemplary heuristic is a large file heuristic, which can recommend that an asset quality be reduced if a quality attribute exceeds a certain parameter. For example, if the asset is an image and its pixels per inch exceed the resolution of the mobile device's display. If the asset is a video, the heuristic can recommend that the bits per pixel of the video be reduced to accommodate the limitations of a given network, e.g., EDGE network: <0.75 BPP, 3G network: <1.0 BPP, and WiFi: <2.0 BPP.

Another exemplary heuristic is a resampling heuristic. This heuristic can determine that a given asset exceeds the maximum display parameters of the sharpest display of any candidate mobile device for potentially displaying the content. For example, if a given asset is a 200×200 pixel image and the best display resolution on a mobile device to which it might be served is 100×100, the heuristic can recommend resampling the image to a 100×100 pixel image to not exceed the display capabilities.

Another exemplary heuristic is a cropped pixel heuristic. This heuristic can determine that an asset includes data that isn't needed for proper display or function of the asset. In a simple example, if an asset is an image, but only a subsection of the image is intended for display, the heuristic can recommend that the image be cropped to include only assets intended for display.

Another exemplary heuristic is a high-latency heuristic. This heuristic can determine that the mobile content is susceptible to poor performance on networks experiencing high latency. For example, if the mobile content includes several small files, it may be more efficient to include all the files in the archive, because their size will not significantly increase the size of the existing archive, and requesting download of each file individually could prove too inefficient due to the network delay in processing the requests.

Another exemplary heuristic is a resource-organization heuristic. This heuristic can recommend assets for inclusion in the archive because of their propensity to be needed regularly. While the archive is rationally created at the outset to include assets that are likely to be needed in some of the first screens of the mobile content, or the assets are likely to regularly viewed, in some instances, testing of the application reveals assets that are not being used, and also reveals assets that are being regularly requested. Accordingly, the heuristic can suggest that unused assets be removed from the archive, and that heavily accessed assets be added to the archive.

Figure 13:
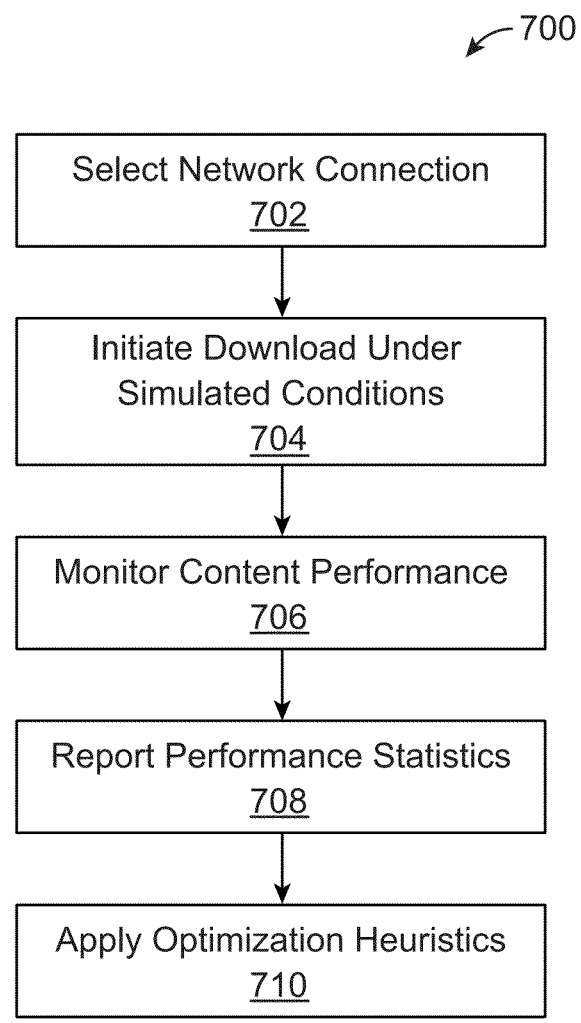
FIG. 13 illustrates a method embodiment of simulating a performance of mobile device, monitoring its performance, and recommending optimizations.

FIG. 13 illustrates an exemplary method 700 of testing the performance of mobile content using a simulated network condition. A network condition is selected for use in a simulation 702. As discussed above, the network condition can be a static condition, or can vary to mimic different mobile device use cases. After the simulation conditions are chosen, the mobile device can download the mobile content 704 under the simulated conditions. The mobile content can be downloaded by requesting individual assets as needed or by downloading an archive file of many assets. As the mobile content is being downloaded and executed on the mobile device, its performance is monitored 706. The performance data of the mobile content can be reported 708 and optimization heuristics can be run using the reported data as inputs to determine suggested optimization strategies for improving the performance of the mobile content 710. In some embodiments, the optimization heuristics can report to an authoring program to automatically optimize the mobile content according to the recommendations.

Figure 14:
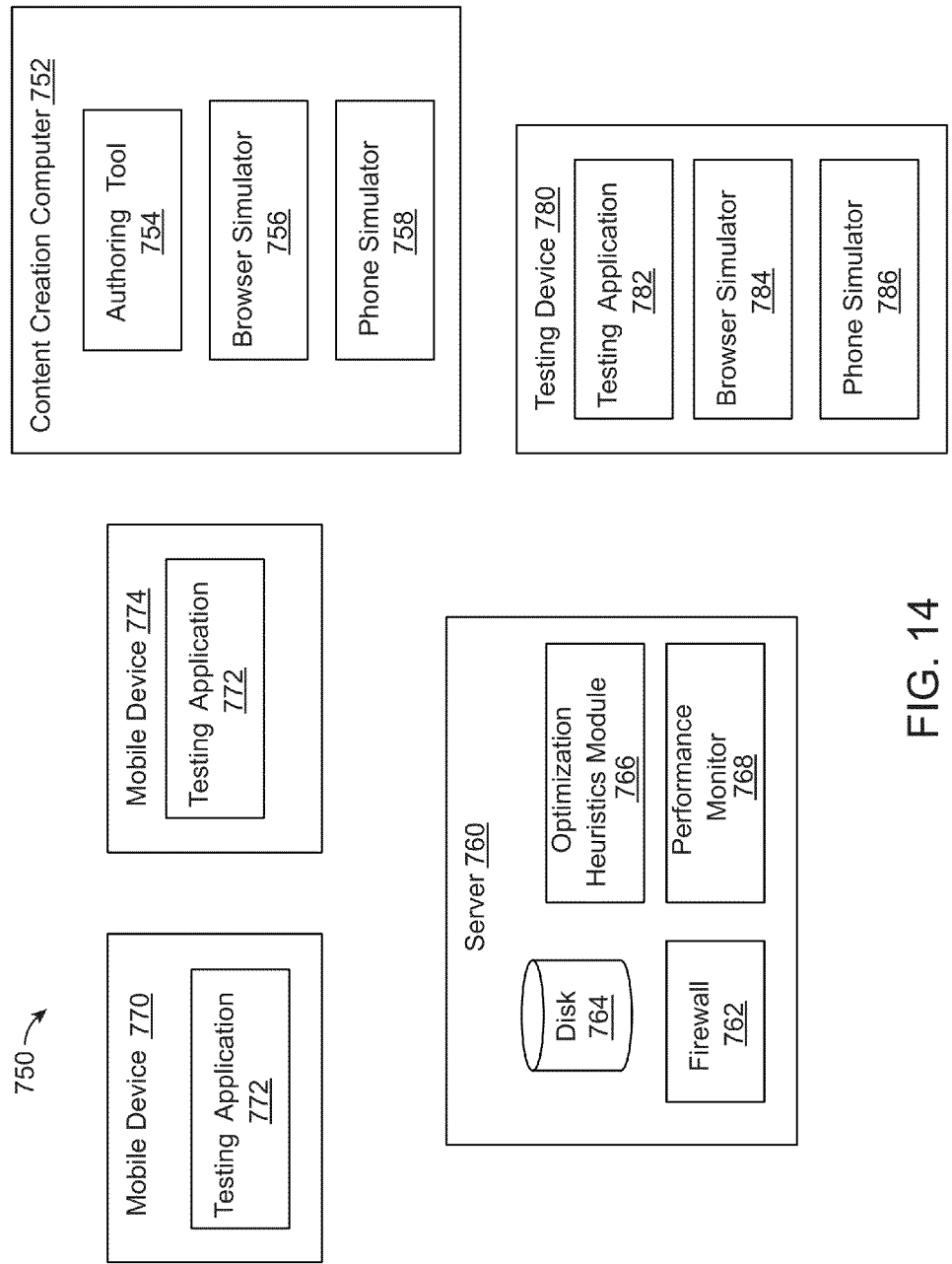
FIG. 14 illustrates an example system embodiment.

FIG. 14 illustrates a schematic diagram of an exemplary system embodiment. System 750 includes a content creation computer 752, mobile devices 770, 774, a server 760, and another testing device 780 communicating over a wired or wireless network.

The content creation computer 752 includes an authoring tool 754 for creating the mobile application, and a browser simulator 756, and a phone simulator 758, both of which perform as discussed above.

Similarly, the testing device 780 also includes a browser simulator 784, and a phone simulator 786. The testing device also includes a testing application 782. The testing device can be any other computer that can also be used in testing the mobile content.

The mobile devices 770, 774 include a testing application 772 and a performance monitor for monitoring the performance of the mobile content according to the present technology described herein.

Server 760 includes a disk 764, a software firewall 762, an optimization heuristics module 766 and a performance monitor 768. When the mobile content is ready for testing, it can be uploaded to the server 760 and stored on the disk 764. An authorized content tester can then access the mobile content using a mobile device such as 770 or 774 or another terminal such as 780. The author can also test the content on the content creation computer 752. In order to test the mobile content, the device on which the testing will take place can have a testing application 772, 782 (it can also be included as part of the authoring tool 754). The testing application allows the device to access the server 760 to download the content and it also reports performance statistics to the performance monitor 768 on the server 760.

In some embodiments, the server 760 can be embodied within the content creation computer 752. In such embodiments, the mobile content can be transferred to any of the testing simulators on the content creation computer 752, testing device 780 or mobile devices 770, 774. In aspects wherein the content creation computer 752 will test the mobile content, the content creation computer 752 acts as a server and a client, wherein the mobile content is served through the software firewall 762 to a testing application on the content creation computer 752 to mimic the network states discussed herein.

In order to simulate different network states as addressed above, the interface illustrated in FIG. 11 can configure settings for the Firewall 762, which can simulate the desired network settings. The software firewall is used to adjust the bandwidth and latency settings to simulate the network conditions discussed above.

The optimization heuristic module 766 receives data from the performance monitor 768 and recommends performance optimizations for the mobile content. The optimization heuristic module 766 could be executed on the mobile devices 770, 774, though due to the limited processing capabilities of mobile devices, it is preferable to run the optimization heuristics on the content creation computer 752 or the server 760.

Figure 15:
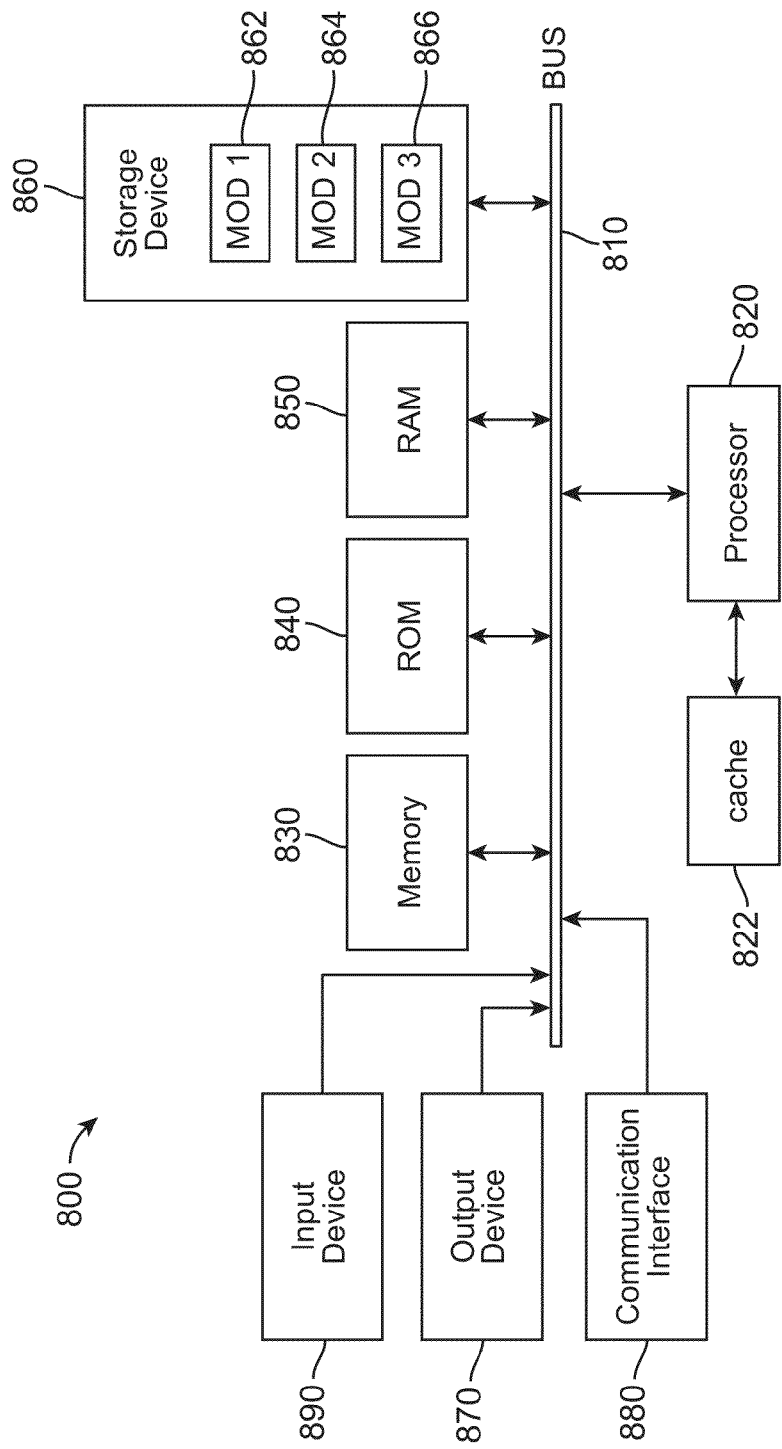
FIG. 15 illustrates an example system embodiment.

As shown in FIG. 15, an exemplary system 800 for implementation of the present technology includes a general-purpose computing device 800, including a processing unit (CPU or processor) 820 and a system bus 810 that couples various system components, including the system memory 830, such as read only memory (ROM) 840 and random access memory (RAM) 850 to the processor 820. The system 800 can include a cache 822 of high speed memory connected directly with, in close proximity to, or integrated as part of the processor 820. The system 800 copies data from the memory 830 and/or the storage device 860 to the cache 822 for quick access by the processor 820. In this way, the cache 822 provides a performance boost that avoids processor 820 delays while waiting for data. These and other modules can be configured to control the processor 820 to perform various actions. Other system memory 830 may be available for use as well. The memory 830 can include multiple different types of memory with different performance characteristics. It can be appreciated that the disclosure may operate on a computing device 800 with more than one processor 820 or on a group or cluster of computing devices networked together to provide greater processing capability. The processor 820 can include any general purpose processor and a hardware module or software module, such as module 1 862, module 2 864, and module 3 866 stored in storage device 860, configured to control the processor 820 as well as a special-purpose processor where software instructions are incorporated into the actual processor design. The processor 820 may essentially be a completely self-contained computing system, containing multiple cores or processors, a bus, memory controller, cache, etc. A multi-core processor may be symmetric or asymmetric.

The system bus 810 may be any of several types of bus structures, including a memory bus or memory controller, a peripheral bus, and a local bus using any of a variety of bus architectures. A basic input/output (BIOS) stored in ROM 840 or the like, may provide the basic routine that helps to transfer information between elements within the computing device 800, such as during start-up. The computing device 800 further includes storage devices 860, such as a hard disk drive, a magnetic disk drive, an optical disk drive, tape drive, or the like. The storage device 860 can include software modules 862, 864, 866 for controlling the processor 820. Other hardware or software modules are contemplated. The storage device 860 is connected to the system bus 810 by a drive interface. The drives and the associated computer readable storage media provide nonvolatile storage of computer-readable instructions, data structures, program modules and other data for the computing device 800. In one aspect, a hardware module that performs a particular function includes the software component stored in a non-transitory computer-readable medium in connection with the necessary hardware components, such as the processor 820, bus 810, display 870, and so forth, to carry out the function. The basic components are known to those of skill in the art, and appropriate variations are contemplated depending on the type of device, such as whether the device 800 is a small, handheld computing device, a desktop computer, or a computer server.

Although the exemplary embodiment described herein employs the hard disk 860, it should be appreciated by those skilled in the art that other types of computer-readable media which can store data that are accessible by a computer, such as magnetic cassettes, flash memory cards, digital versatile disks, cartridges, random access memories (RAMs) 850, read only memory (ROM) 840, a cable or wireless signal containing a bit stream and the like, may also be used in the exemplary operating environment. Non-transitory computer-readable storage media expressly exclude media, such as energy, carrier signals, electromagnetic waves, and signals per se.

To enable user interaction with the computing device 800, an input device 890 represents any number of input mechanisms, such as a microphone for speech, a touch-sensitive screen for gesture or graphical input, keyboard, mouse, motion input, speech and so forth. An output device 870 can also be one or more of a number of output mechanisms known to those of skill in the art. In some instances, multimodal systems enable a user to provide multiple types of input to communicate with the computing device 800. The communications interface 880 generally governs and manages the user input and system output. There is no restriction on operating on any particular hardware arrangement, and therefore, the basic features here may easily be substituted for improved hardware or firmware arrangements as they are developed.

For clarity of explanation, the illustrative system embodiment is presented as including individual functional blocks including functional blocks labeled as a "processor" or processor 820. The functions these blocks represent may be provided through the use of either shared or dedicated hardware, including, but not limited to, hardware capable of executing software and hardware, such as a processor 820, that is purpose-built to operate as an equivalent to software executing on a general purpose processor. For example, the functions of one or more processors presented in FIG. 15 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 840 for storing software performing the operations discussed below, and random access memory (RAM) 850 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 800 shown in FIG. 15 can practice all or part of the recited methods, can be a part of the recited systems, and/or can operate according to instructions in the recited non-transitory computer-readable storage media. Such logical operations can be implemented as modules configured to control the processor 820 to perform particular functions according to the programming of the module. For example, FIG. 15 illustrates three modules Mod1 862, Mod2 864 and Mod3 866 which are modules controlling the processor 820 to perform particular steps or a series of steps. These modules may be stored on the storage device 860 and loaded into RAM 850 or memory 830 at runtime, or may be stored as would be known in the art in other computer-readable memory locations.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc., that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only, and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

The invention claimed is:

1. A system, comprising:
   an authoring module that enables a user to author mobile content configured for wireless transmission to a mobile device; and
   a testing module for testing how well the mobile content performs on the mobile device, wherein the testing module is configured to:
      enable the user to select from a list of connection simulations, wherein each connection simulation is based on different connection statistics reported by other mobile devices used in non-simulated environments;
      receive a selection of a connection simulation to simulate; and
      simulate wireless transmission of the mobile content to the mobile device based on the selected connection simulation.

2. The system of claim 1, further comprising a testing configuration interface module configured to accept user inputs that select available simulated connected states that are simulated by the testing module.

3. The system of claim 1, further comprising a performance monitoring module configured to monitor the performance of the mobile content with the simulated connection states provided by the testing module.

4. The system of claim 3, further comprising a reporting module configured to report performance statistics obtained by the performance monitoring module.

5. The system of claim 4, further comprising an optimization module configured to analyze the statistics reported by the reporting module and based on the analysis recommend optimizations of the mobile content.

6. The system of claim 1, wherein the simulating involves simulating a connection that begins in a first connection state and switches to a second connection state during the simulation for testing the performance of the mobile content.

7. A computer-implemented method, comprising:
simulating a network connection state encountered by a mobile computing device;
testing an operation of an item of content under conditions associated with the simulated network connection state; and
observing a performance of the operation of the item of content on the mobile device under the conditions associated with the simulated network connection state, wherein the simulated network connection state is selected from a list of connection simulations and each connection simulation is based on different connection statistics reported by other mobile devices used in non-simulated environments.

8. The computer-implemented method of claim 7, further comprising compiling performance statistics descriptive of the observed performance of the operation of the item of content under the conditions associated with the simulated network connection state.

9. The computer-implemented method of claim 8, further comprising recommending an optimization of the item of content based on an analysis of the compiled performance statistics.

10. The computer-implemented method of claim 9, wherein the analysis used in recommending the optimization includes a comparison of the compiled statistics against a database of previously observed content performance statistics.

11. The computer-implemented method of claim 9, wherein the analysis used in recommending the optimization includes matching a heuristic to the compiled performance statistics.

12. The computer-implemented method of claim 11, wherein the heuristic is a high-network-latency heuristic that recommends including additional items into an archive.

13. The computer-implemented method of claim 11, wherein the heuristic is a compression heuristic that recommends additional compression of an asset.

14. The computer-implemented method of claim 7, wherein the simulated network connection state is selected via a user interface.

15. The computer-implemented method of claim 14, wherein the network connection state includes a network, an average download speed, and a latency parameter.

16. The computer-implemented method of claim 7, wherein the network connection state includes a variable connection state, and simulating the network connection state involves switching from a first network connection state to a second network connection state.

17. A non-transitory computer-readable medium having computer-readable code stored thereon for causing a computer to execute a method, comprising:
receiving a selection of a connection simulation that is based on different statistics reported by first mobile device used in a non-simulated environment;
simulating to a second mobile device a network connection state that is based on the selected connection simulation;
testing an operation of mobile content under conditions associated with the simulated network connection state, the mobile content being a collection of assets; and
observing how well the mobile content performs on the second mobile device under the conditions associated with the simulated network connection state.

18. The non-transitory computer-readable medium of claim 17, further comprising compiling performance statistics descriptive of the observed performance of the operation of the mobile content under the conditions associated with the simulated network connection state.

19. The non-transitory computer-readable medium of claim 18, further comprising recommending an optimization of the mobile content based on an analysis of the compiled performance statistics.

20. The non-transitory computer-readable medium of claim 19, wherein the analysis used in recommending the optimization includes a comparison of the compiled statistics against a database of previously observed content performance statistics.

21. The non-transitory computer-readable medium of claim 19, wherein the analysis used in recommending the optimization includes matching a heuristic to the compiled performance statistics.

22. The non-transitory computer-readable medium of claim 21, wherein the heuristic is a high-network-latency heuristic that recommends including additional assets into an archive.

23. The non-transitory computer-readable medium of claim 21, wherein the heuristic is a compression heuristic that recommends additional compression of an asset.

24. The non-transitory computer-readable medium of claim 17, wherein the simulated network connection state is selected via a user interface.

25. The non-transitory computer-readable medium of claim 24, wherein the network connection state includes a network, an average download speed, a percentage of bits dropped and a latency parameter.

26. The non-transitory computer-readable medium of claim 17, wherein the network connection state includes a variable connection state and the simulation switches from a first network connection state to a second network connection state.

27. The non-transitory computer-readable medium of claim 19, wherein the optimization includes recommending resampling of an asset that includes a greater number of pixels that can be displayed by the second mobile device to an asset having the same number of pixels as the second mobile device.

28. The non-transitory computer-readable medium of claim 19, wherein the optimization includes recommending discarding superfluous bits from a cropped image.

29. The non-transitory computer-readable medium of claim 17, wherein the simulated network connection state simulates an observed connection state reported by a field device.

* * * * *

UNITED STATES PATENT AND TRADEMARK OFFICE
CERTIFICATE OF CORRECTION

| | | |
|---|---|---|
| PATENT NO. | : 8,605,613 B2 | Page 1 of 1 |
| APPLICATION NO. | : 12/969494 | |
| DATED | : December 10, 2013 | |
| INVENTOR(S) | : Ralph Zazula et al. | |

It is certified that error appears in the above-identified patent and that said Letters Patent is hereby corrected as shown below:

In the Claims,

Col. 17, line 1, Claim 3, line 1: "claim 1" should read --claim 2--.

Col. 17, line 10, Claim 5, line 3: "and based on the analysis recommend" should read --and, based on the analysis, recommend--.

Col. 17, line 16, Claim 6, line 4: "the performance" should read --a performance--.

Col. 17, line 24, Claim 7, line 8: "mobile device" should read --mobile computing device--.

Col. 17, line 29, Claim 7, line 13: "mobile devices" should read --mobile computing devices--.

Col. 17, line 42, Claim 10, line 3: "compiled statistics" should read --compiled performance statistics--.

Col. 18, line 45, Claim 25, line 4: "dropped and" should read --dropped, and--.

Col. 18, line 48, Claim 26, line 3: "the simulation" should read --the connection simulation--.

Signed and Sealed this
Twenty-fourth Day of February, 2015

Michelle K. Lee
*Deputy Director of the United States Patent and Trademark Office*